(12) United States Patent
Guo et al.

(10) Patent No.: US 6,827,916 B2
(45) Date of Patent: Dec. 7, 2004

(54) METHOD OF MAKING SILICA

(75) Inventors: Kai Guo, Beijing (CN); Jianfeng Chen, Beijing (CN); Fen Guo, Beijing (CN); Hong Jia, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 10/436,854

(22) Filed: May 13, 2003

(65) Prior Publication Data

US 2003/0219370 A1 Nov. 27, 2003

Related U.S. Application Data

(63) Continuation-in-part of application No. PCT/CN01/01554, filed on Nov. 14, 2001.

(30) Foreign Application Priority Data

Nov. 14, 2000 (CN) ........................................ 00132275 A

(51) Int. Cl.$^7$ ........................... C01B 33/12; C01B 33/32
(52) U.S. Cl. ....................................... 423/335; 501/154
(58) Field of Search ................................ 423/324, 325, 423/335, 658.5; 501/154

(56) References Cited

U.S. PATENT DOCUMENTS

| | | | | | |
|---|---|---|---|---|---|
| 3,719,741 A | * | 3/1973 | Burke, Jr. | .................... | 423/339 |
| 3,855,394 A | * | 12/1974 | Burke, Jr. | .................... | 423/339 |
| 5,302,364 A | * | 4/1994 | Feinblum | ..................... | 423/340 |
| 5,395,604 A | | 3/1995 | Harris et al. | | |
| 5,445,804 A | * | 8/1995 | Iosef | ......................... | 423/339 |

FOREIGN PATENT DOCUMENTS

| | | |
|---|---|---|
| CN | 1097718 A | 1/1995 |
| CN | 1183379 A | 6/1998 |
| WO | WO 98/13008 | 4/1998 |

* cited by examiner

Primary Examiner—Stanley S. Silverman
Assistant Examiner—Colleen P. Cooke
(74) Attorney, Agent, or Firm—Daniel F. Nesbitt; Donald E. Hasse

(57) ABSTRACT

A preparation method of silica, especially superfine silica, with water glass and carbon dioxide as major raw materials in a carbonization reaction conducted under a high gravity field, typically in a Higee reactor.

20 Claims, 4 Drawing Sheets

METHOD OF MAKING SILICA

CROSS-REFERENCE TO RELATED APPLICATIONS

This is a continuation-in-part of copending International Application PCT/CN01/01554, with an international filing date of Nov. 14, 2001.

FIELD OF THE INVENTION

The present invention relates to a method of making silica, especially superfine silica, through a carbonization reaction with water glass and carbon dioxide as raw materials.

BACKGROUND OF THE INVENTION

Silicon dioxide ($SiO_2 \cdot nH_2O$) known as white carbon black (silica) is a widely used raw material in inorganic chemicals. It is used mainly as reinforcing fillers for the sake of its excellent merits of acid resistance, base resistance, high temperature resistance and stability in its chemical properties. Generally, the mean particle size of superfine silica is in the range of from 1 nm to 100 nm. Because of a narrow particle size, huge specific surface area, and strong or weak hydrogen bonds formed between surface silanol group and active silane bond in the molecule, superfine silica has special characteristics such as good electric insulation, hygroscopicity, extinction and dispersivity. Therefore superfine silica is widely used in the field of rubber, plastic, paper-making, ink and daily-used chemicals and the like.

Although there are many methods of preparing silica, carbonization is a commonly used method of preparing silica nowadays. In the carbonization method, water glass is reacted with carbon dioxide ($CO_2$) in carbonization reaction, then the resultant is acidified, aged, filtered, washed, dried, and ground to make the final product, silica. Although the raw materials, i.e., water glass and $CO_2$, are available easily, the process is simple and the operation is easy, the resulted product from this method has such shortcomings that particle size is large, the distribution of particle size is not uniform, and purity is not high, which resist the wider use of the method. In the process of carbonization to make silica, the carbonization step is the most critical section, which can influence the qualities of final product. At the same time, reactor carrying out the carbonization reaction is also important. As reported in an article entitled 'Engineering Analysis of White Carbon Black Preparation of Carbonization' (INORGANIC CHEMICALS INDUSTRY 1986 No. 2), during the process of carbonization in tank reactor with stirring, the stirring speed is 200 rpm. Higher stirring speed will cause liquid to splash easily, which cannot promote the reaction, but gives to a negative result. The reaction will last 6 hours. After completion of the reaction, the calculated conversion is only 71.5% and pH value is 9 to 10. In order to increase the conversion to 95%, the reaction time of not less than 95.6 hours is required.

A paper entitled "Discussion on Silica Preparation of Carbonization Technology in Kiln Gas Bubble Tower" (INORGANIC CHEMICALS INDUSTRY 1988 No.2) discloses a carbonization reaction carried out in a bubble tower. The bubble tower simplified the apparatus and raised the capability of production in contrast to the conventional stirring reaction tank. Nevertheless, it also takes 4–5 hours to finish the reaction.

On the basis of the prior art works, the inventors of the invention surprisingly find that silica, especially superfine silica, can be obtained through carbonization reaction under a high gravity field. The method according to the invention can reduce reaction time of carbonization, and increase reaction efficiency, and it can improve the qualities of silica product. The mean particle size of silica prepared by the invention is small, only 1 to 100 nm. Moreover, the distribution of the resulted silica according to the invention is uniform and narrow, and its dispersiveness is excellent.

So the purpose of this invention is to provide a method of preparing silica, which can reduce reaction time of carbonization.

SUMMARY OF THE INVENTION

The invention provides a method of making silica, especially superfine silica. The method comprises the following steps of: proceeding a carbonization reaction using water glass and $CO_2$ as raw materials under high gravity field, conducting post-treatments for the resultant in a conventional manner for silica product, and collecting resulted silica, especially superfine silica, more especially nano-silica. In general, the post-treatments mentioned above comprise acidifying, insulating aging, filtering, washing and/or drying as well as grinding optionally. Silica product obtained according to the invention is superfine. The mean particle size of the resulted silica is in the range of about 1 to about 100 nm, preferably about 10 to about 50 nm, more preferably 15 to about 30 nm.

DETAILED DESCRIPTION OF THE INVENTION

Generally speaking, a carbonization method is always used to prepare silica by reacting water glass and gaseous $CO_2$. Water glass, which is diluted by water, reacts with gaseous $CO_2$ in a tank reactor or bubble tower reactor, stirring as well. The pH value of the liquid reactant decreases constantly during the process of reaction. When the pH value declines to a certain degree, it changes slowly. At this time, the reaction should be terminated by shutting down the $CO_2$ gas feed. The resultant is acidified by adjusting pH with an acid, and insulatingly aged to precipitate silica. The resulted silica is then washed, filtered, dried, ground and sieved to obtain the final silica product.

Superfine silica can be obtained through carbonization reaction with water glass and $CO_2$ as raw materials under high gravity field, preferably in a reactor hereinafter referred to as Higee. The method according to the invention can reduce reaction time significantly, increase reaction efficiency, and enhance the qualities of the silica product, for example, by lowering its mean particle size and narrowing its distribution and increasing its dispersivity.

The term "high gravity field, Higee" used in the invention means a centrifugal force field generated by rotation of packed beds in the reactor. The phrase "reaction under high gravity field" means that liquid and/or gas reactants are introduced into the high gravity field and react while they are moved centrifugally, or the liquid reactant is moved from the center of the rotating packed bed centrifugally and the gas reactant is introduced oppositely with respect to the liquid reactant along the radial direction when the packed bed is rotating. In general, the reaction represented by the phrase 'reaction under high gravity' can be carried out in any Higee reactor, rotating bed reactor, or rotating packed bed (RPB).

Figure 1:
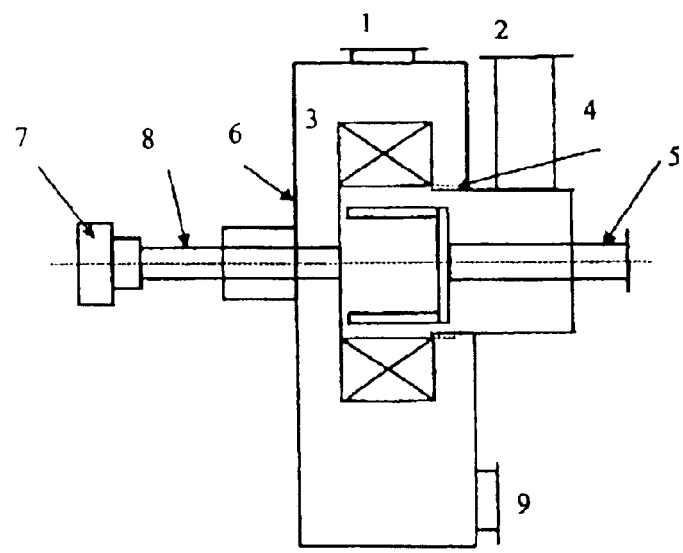
FIG. 1 shows a schematic diagram of a reactor used to generate high gravity field (hereinafter referred to as Higee reactor).
Figure 2:
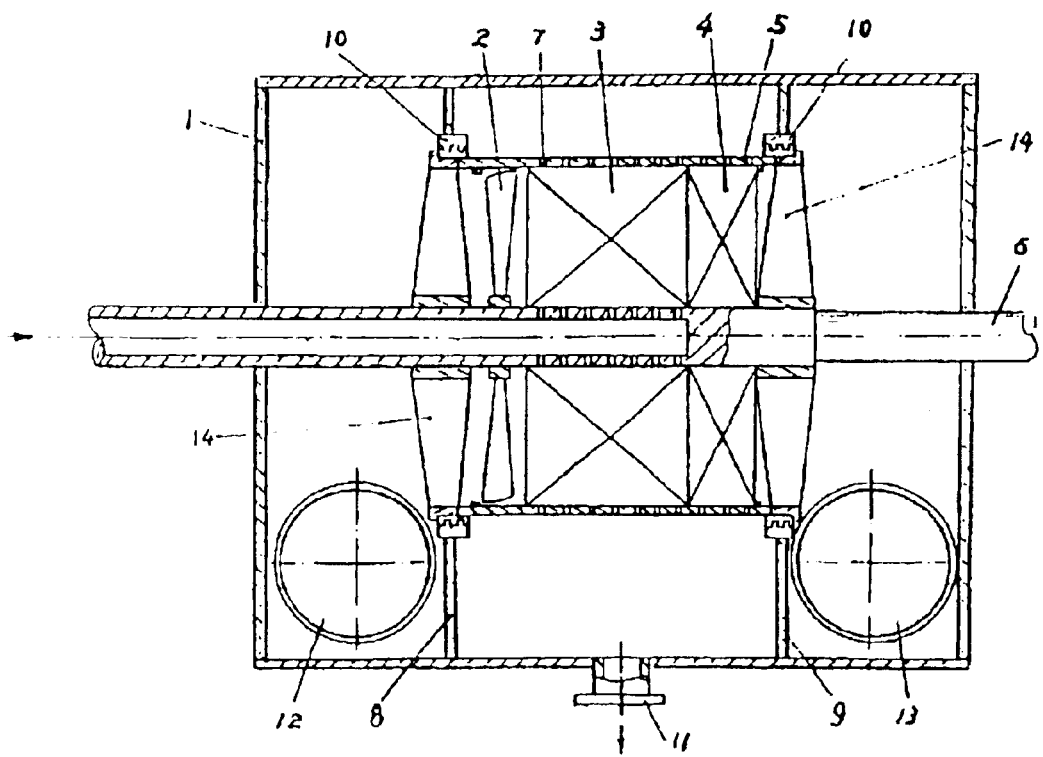
FIG. 2 shows a schematic diagram of the Higee reactor of Chinese Patent No. ZL95107423.7.

As shown in FIG. 1, the Higee reactor has a liquid or gas inlet 1, a gas or liquid inlet 2, and an inner chamber 3. As shown in FIG. 2, the inner chamber 3 is packed with fillers. The fillers used in the invention are porous fillers which are known to the skilled persons in the field. The fillers used in the invention comprise, but not limited to, foam metal or non-metal material, and metal or non-metal wire mesh.

The centrifugal movement used to obtain the high gravity field according to the invention can be conducted in horizontal, vertical or any other arbitrary direction. But horizontal or vertical is more common.

The Higee reactor used in the invention is that reactor used in the art to generate high gravity field containing RPBs, which is current technology. In one of the embodiments of the invention, the Higee reactor used in the invention is a Higee reactors illustrated in Chinese Patent ZL92100093.6 and Chinese Patent ZL 95107423.7.

During the process of reaction in such Higee reactors, the liquid reactant enters the inner chamber of the Higee reactor through the liquid inlet pipe, and is sprayed to the inner edge of packed bed by a distributor pipe. Gas reactant is introduced to the packed bed of the Higee reactor tangentially and enters the packed bed from the outer edge of packed beds through gas inlet pipe. Especially, in the process of carbonization reaction, the liquid reactant flowing from the rotating packed bed is collected and discharged from the Higee reactor through a liquid outlet, and returns to the rotating packed bed through the liquid inlet again. So the reaction can be operated in continuous circulation.

Under the high gravity field, the carbonization reaction of the invention uses water glass and $CO_2$ as raw materials. Water glass is dissolved in water to form an aqueous solution. The specific density of the solution is well known to common technicians in this field. However, the specific density is typically about 6 to about 13°Be', preferably about 7.5 to about 12°Be, and more preferably about 7.5 to about 10°Be'. Gaseous $CO_2$ used in the carbonization reaction of the invention can be a mixture of $CO_2$ with other gases which are inert to the reaction. Typically the $CO_2$ content of the mixture is over 20% (volume). Preferably, the gaseous $CO_2$ reactant is pure $CO_2$ gas. In the carbonization reaction of the invention, the ratio of water glass to pure $CO_2$ can be optional, but typically is not less than 1:1 (molar).

Additives such as a flocculating agent and/or a surfactant can be added to the liquid raw materials of the reaction. The flocculating agent used in the invention can comprise one well known in the art. For example, the flocculating agent can comprise, but is not limited to, sodium chloride. The flocculating agent can be used in an aqueous solution or as a solid dissolved in the water glass aqueous solution. The typical level of the flocculating agent is about 11 to about 31% (molar) of the solid parts of water glass solution. The surfactant used in the method of the invention is also well known in the field. Such surfactant comprises, but is not limited to, glycerin, triethanolamine and $C_2$ to $C_5$ alcohol. The typical level of the surfactant added is about 2 to about 4% (volume) of the solid parts of water glass solution.

In the Higee reactor, the rotating speed of the packed bed is typically about 200 to about 2000 rpm, preferably about 400 to about 1500 rpm, more preferably about 1000 to about 1200 rpm. In other words, the desired centrifugal acceleration is typically about 20–40,000 $m/s^2$, preferably about 200–20,000 $m/s^2$, more preferably about 2000–10,000 $m/s^2$. A person skilled in the art can determine the rotating speed of the packed bed according to the desired centrifugal acceleration.

In the method of the invention, the flow rate of reactants in the feeding pipe can be regulated according to practical conditions.

According to the invention, the method of making silica comprises the steps of:

diluting water glass to an aqueous solution with water;

conducting the carbonization reaction between the aqueous solution of water glass and gaseous $CO_2$; and post-treating the resultant silica typically by acidifying, insulating aging, washing, filtering, drying or optionally grinding;

wherein the method is characterized in that the carbonization reaction proceeds under a high gravity field. Preferably, the carbonization reaction is carried out in a Higee reactor.

In the reaction mentioned above, the steps of acidifying, insulating aging, washing, filtering, drying or grinding, if necessary, can employ a way known by common technicians in this field. See, for instance, the contents disclosed in 'INORGANIC CHEMICALS INDUSTRY'. The step of acidifying can adopt any known strong organic or inorganic acid. Insulating aging (i.e., aging) can adopt a well-known condition in this field. Drying can use such technologies as spray drying, revolving-streaming drying, stove drying, azeotropic distillation or supercritical fluid drying, et al, but is not limited to these.

With reference to FIG. 1, according to one of the embodiments, in a Higee reactor, the gas reactant is introduced into the reactor from gas inlet 1 and is discharged to gas outlet 2. A liquid reactant is injected into the reactor through liquid inlet 5, having a seal 4. Moreover, shaft 8 with which shaft-joint 7 coupled drives rotor 3 to generate centrifugal movement. The reactants above react in the rotating packed bed in the Higee reactor, which is contained in shell 6. The liquid flows through the rotating packed bed, and out of the reactor to liquid outlet 9, and can return to the Higee reactor and react again with the gaseous $CO_2$. When the carbonization reaction finishes, post-treating the crude silica product in the collecting tank, e.g., the tank 13 in FIG. 4, can comprise acidifying, insulating aging, filtering, washing, drying as well as grinding, if necessary, to obtain the product silica.

The method according to the invention can be carried out in the Higee reactor according to Chinese Patent No. ZL95107423.7 to conduct the carbonization reaction, as illustrated in FIG. 2.

Figure 3:
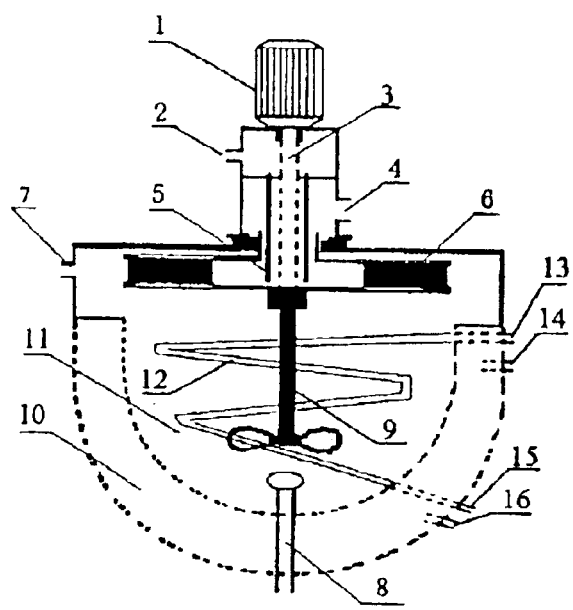
FIG. 3 shows a schematic diagram of a Higee reactor used in one embodiment.

According to another embodiment of the invention, the Higee reactor shown in FIG. 3 can be used. With reference to FIG. 3, an aqueous solution of water glass is injected into the reactor through liquid inlet 2, while $CO_2$ gas is introduced from gas inlet 7. In the reactor, the aqueous solution of water glass reacts with $CO_2$ gas under a high gravity field generated by the Rotating Packed Beds (RPBs) with the motor 1 driving packed rotor 6 through shaft 3. In particular, for example, the method includes: (1) Selecting water glass in industrial grade whose modulus of $SiO_2$: $Na_2O$ is about 3.1 to about 3.2, while the content of $SiO_2$ is about 27% to about 28% by weight. Water glass is diluted with water to about 6 to about 13°Be' (specific density). (2) Adding 8 to about 12 liters of the water glass aqueous solution into the Higee. The reaction can be conducted at ambient temperature or can be heated to about 20 to about 100° C. by heater jacket 10, preferably about 40 to about 80° C., more preferably about 60° C. Warm water flows in through jacket inlet 14 and is discharged from outlet 16. To the system, NaCl as the flocculating agent with a concentration of about 6% to about 30% is added, in which molar ratio of NaCl to the solid parts of water glass aqueous solution is about 11% to about 31%. The surfactant is also added to the system with a ratio by volume of the surfactant to water glass aqueous solution of about 1% to about 5%. (3) The resulted liquid mixture in tank 11 is agitated by stirring paddle 9 and the reaction temperature is maintained at about 60 to about 90° C. (4) The feed liquid recirculating pump is turned on, $CO_2$ (pure gas or mixture thereof) is introduced, and the carbonization reaction proceeds after the system temperature becomes stable. (5) When the variation of pH value of the liquid reactant becomes extremely slow, the gas reactant is shut off and the reaction terminates. Liquid product leaves the feed liquid tank from liquid outlet 8 and gas present in the tank is released from gas outlet 4, after reaction finished or during the course of reaction. Warm water coiled pipes 12, which are used to heat reaction system, have been set in the reaction tank previously. Warm water enters from coiled pipes 13 and leaves throug outlet 15. (6) The pH value of liquid product is adjusted with hydrochloric acid to around pH 4 to about 5. Silica is precipitated from the liquid mixture flowed through the liquid outlet 8 after aging. (7) The precipitated crude silica is filtered and washed with distilled water. (8) The washed crude silica is dried. The heating decrement is controlled to about 5 to about 8%, and igniting decrement less than 7%. The dried silica is ground and sieved to form in superfine silica product.

Figure 4:
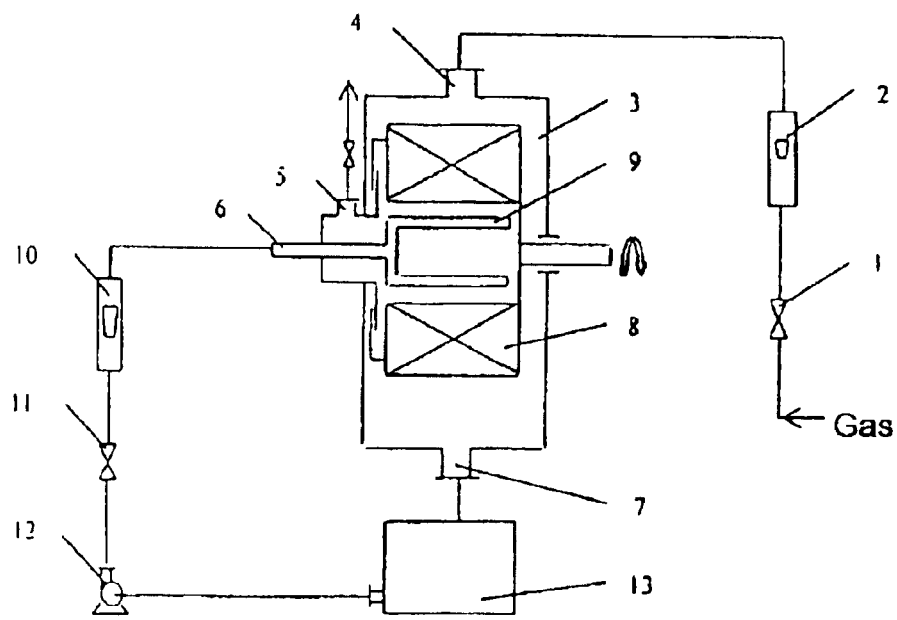
FIG. 4 shows a schematic diagram of a Higee reactor used in another embodiment.

According to another embodiment, as shown in FIG. 4, the Higee reactor in the Chinese Patent No. ZL95105343.4 can be used for the carbonization reaction according to the invention.

When the Higee reactor is used in the method according to the invention, a liquid mixture containing water glass flows into the reactor through a liquid distributor and is sprayed to the inner edge of the porous packing of RPBs. Driven by the packing of RPBs, the peripheral speed of the liquid increases. The liquid mixture is pushed to the outer edge of packing bed by centrifugal force. The gas reactant containing $CO_2$ enters into the Higee reactor tangentially through a gas inlet and enters the packing bed from the outer edge of packing on the effect of gas pressure. The gas and the liquid mixture flow counter-currently in general. Gas, which has finished mass transfer with the liquid reactant and the reaction, is discharged from a gas outlet in the center of the RPBs, and leaves the Higee reactor. Liquid mixture is thrown to the wall of reactor by the rotating packed bed, where it collects and leaves the RPBs through a liquid outlet. The liquid mixtures returns to the liquid inlet of reactor through via a feed liquid recirculating pump (not shown), and reacts with $CO_2$ gas continuously in the RPBs of Higee reactor. The gas reactant is stopped and reaction terminated when the pH value of liquid reactant shows almost no change. The post-treatments are the same as a conventional carbonization reaction.

Because a high gravity carbonization reactor, which generates a constant and huge high gravity field by the rotating packing in the Higee reactor, is used in the method according to the invention, the liquid mixture contacts countercurrently with the gas reactant at a large relative velocity in the pores of the packing. On account of high interfacial area, severe turbulence, strong mixing, and rapid refreshing of the interface in the Higee reactor, the contacting area is enlarged, mass transfer is reinforced greatly, and conversion is heightened. Meanwhile, the method according to the invention reduces reaction time significantly, enlarges efficiency of the reaction, and minimizes the production period. It is indicated in the following examples that the entire carbonization reaction time is less than 1 hour under the conditions that the content of $CO_2$ is about 20% by volume and the total gas flow rate is over 1 m³/h. If total gas flow rate or concentration of $CO_2$ gas is increased, the reaction time will be further shortened. Moreover, the condition of high gravity field reinforces micro-mixing and micro-reaction, and makes the product size superfine. A flocculating agent and surfactant can be added to prevent silica particles from agglomerating, and are helpful to get nano-sized product.

Figure 5:
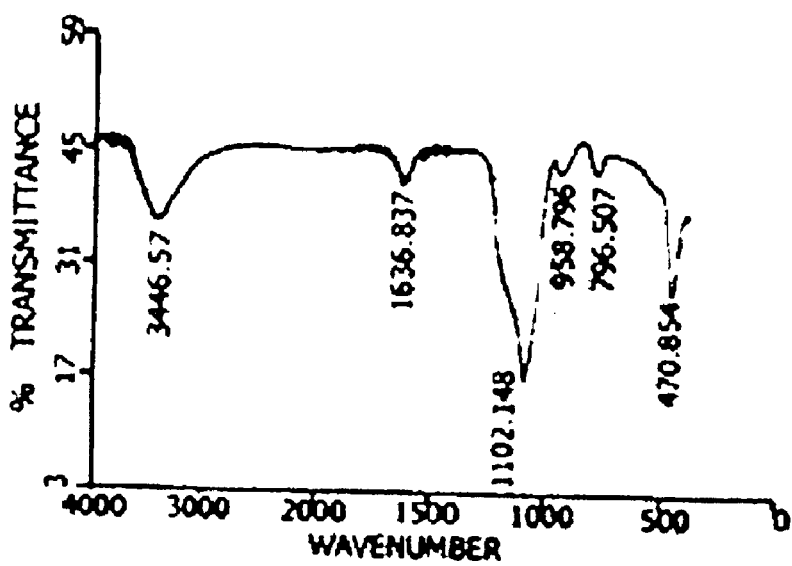
FIG. 5 shows the IR spectra of a silica obtained according to the invention.
Figure 6:
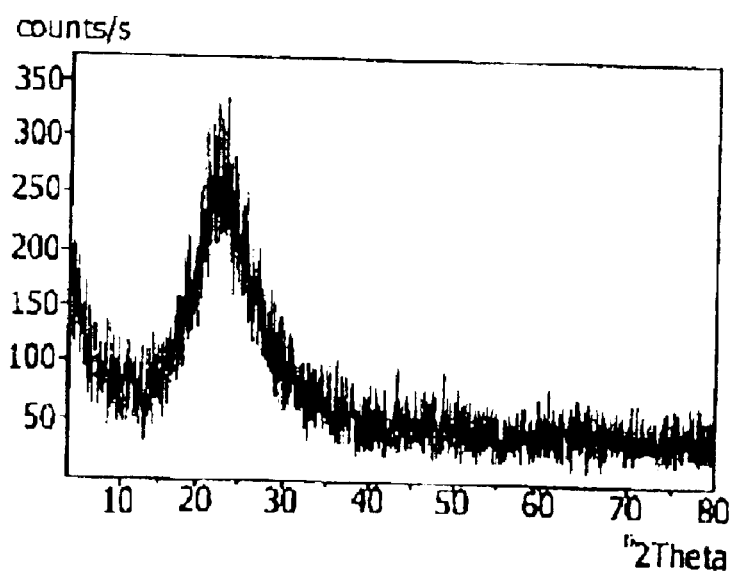
FIG. 6 shows the XRD patterns of a silica obtained according to the invention.
Figure 7:
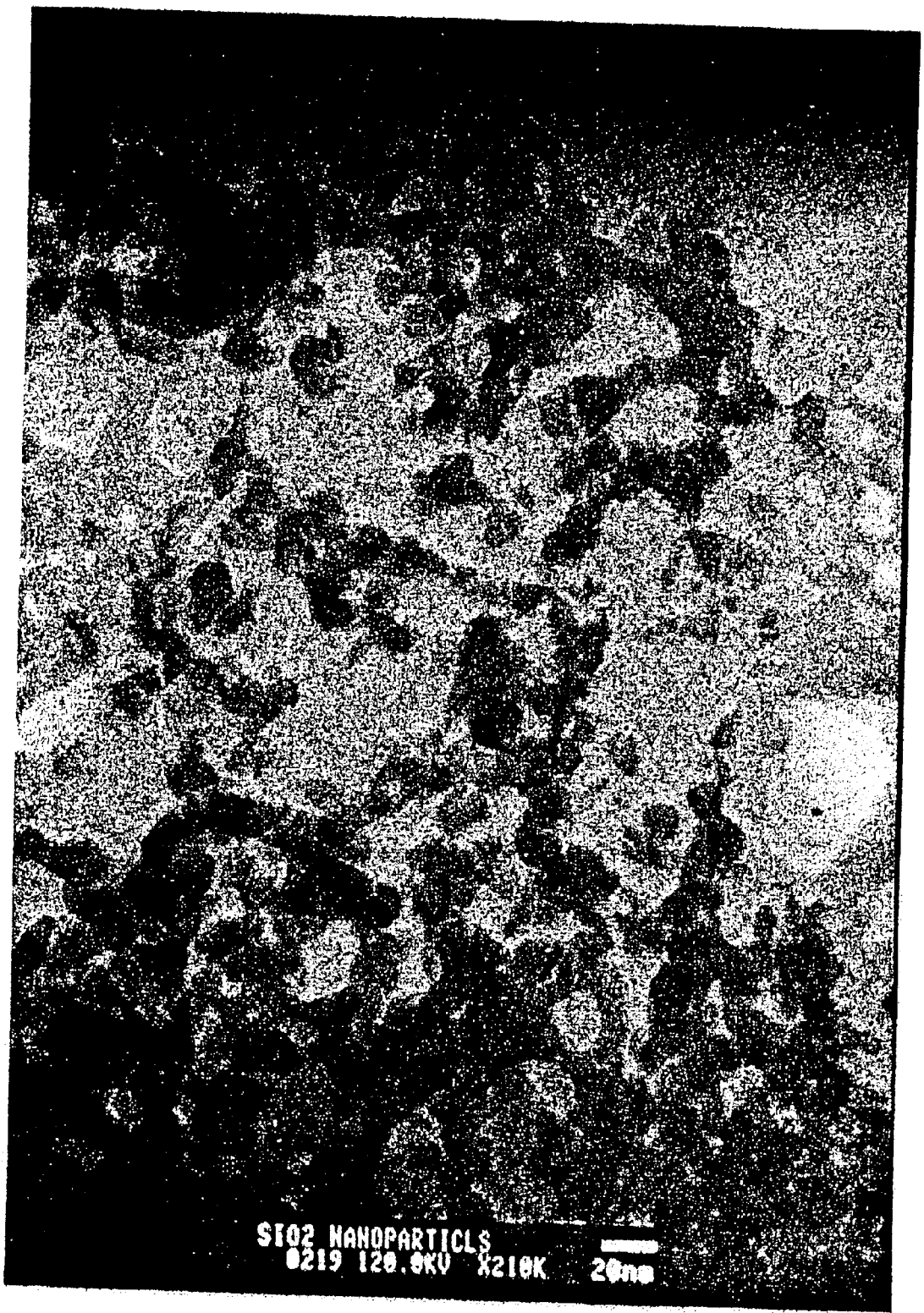
FIG. 7 shows the TEM photograph of a silica obtained according to the invention.

The silica particles obtained according to the invention have been measured by IR spectra (FIG. 5), XRD patterns (FIG. 6) and TEM photograph. The results show that purity of the product is high, the distribution of particle size is even, and the obtained silica is superfine, especially nano-sized silica. The mean particle size is about 1 to about 100 nm, preferably about 10 to about 50 nm, more preferably about 15 to about 30 nm. The silica particles thus obtained are in the form of spheres which have large specific surface area.

The $CO_2$ gas used in the carbonization reaction of the invention can be industrial grade pure $CO_2$ or its mixture, whose content of $CO_2$ is greater than 20% by volume. As a result, certain kinds of exhaust gases from some industrial processes can be reused as raw materials. This can have a significant environmental impact.

EXAMPLES

The followings are examples of the invention illustrating the process of preparing silica, especially nano-silica, but which are not used to limit the invention. The examples further explain the embodiments in the present invention. It should be understood that the examples in this invention are only to explain, not to restrict this invention. On condition of no departure from general spirit and domain of the invention, common technicians in this field can make any kind of alternation, which is a consensus of common technicians in this field. All the concentrations of the examples are percentages on the basis of weight, unless specially pointed out.

Example 1

Ten (10) liters of sodium silicate aqueous solution whose specific density is 7.5°Be' is formulated, in which the ratio by volume of water glass: water is 1:6. The mixture is filtered to remove impurities and placed in the Higee reactor. The Higee reactor containing the mixture is heated to 60° C. Aqueous solution containing NaCl, which is obtained by dissolving 60 g NaCl in 1 liter of water, and has a ratio by weight of NaCl to solid parts of water glass aqueous solution of 11%, is added to the mixture. 0.2 liter of triethanolamine, which is 2% of the volume of water glass aqueous solution, is also added. The mixture is stirred constantly. The rotating speed of the RPBs is set to 2000 rpm. Temperature is maintained from 60 to about 90° C. After the temperature is stable, the feed liquid recirculating pump is turned on and pure $CO_2$ gas is introduced at the same time. Gas flow rate is 0.8 m$^3$/h. After 16 min, the reaction is completed. HCl is added to adjust the pH value of the discharged reaction liquid to 5. Insulating aging is carried out for 90 min (60 to about 90° C.). The resulted slurry is filtered forcedly, and the filter cake is washed with distilled water 3 to about 4 times. The washed product is put in stove to dry for 6 hours at 110 to about 115° C. Optionally, the dried product, silica, is ground and sieved by 400 description sieve for final product. After analysis, the mean particle size of primary particles of the superfine silica product is 15 nm, the BET specific surface area is 210 m$^2$/g. Conversion of carbonization reaction is 85%.

Example 2

Except for the following differences, the remaining conditions are the same as Example 1.

The rotating speed of RPBs is 800 rpm. The surfactant is 0.3 liter of ethanol, 3% of the volume of water glass aqueous solution. The carbonization reaction time lasts 22 min. The pH value after aging is 4. The mean particle size of primary particle of precipitation product is 30 nm. Particle size of 90% particles is in the range of 22 to about 28 nm. The BET specific surface area is 136 m$^2$/g.

Example 3

Except for the following differences, the remaining conditions are the same as Example 1.

The water glass aqueous solution us formulated at the ratio of water glass: water of 1:5 by volume, whose specific density is 8.7°Be'. The rotating speed of RPBs is set to 1500 rpm. The flocculating agent is the aqueous solution obtained by dissolving 120 g NaCl in 1 liter of water, in which the weight ratio of NaCl to solid parts of water glass aqueous solution is 18.6%. 0.25 liter of glycerin is used as the surfactant in the carbonization reaction. The mean particle size of primary particles of precipitation product is measured as 24 nm. The particle size of 90% particles is in the range of 17 to about 21 nm. The BET specific surface area is 181 m$^2$/g.

Example 4

Except for the following differences, the remaining conditions are the same as Example 1.

Ten (10) liters of sodium silicate aqueous solution is formulated whose specific density is 12°Be', in which volume ratio of water glass: water is 1:3. An aqueous solution is added containing 300 g NaCl dissolved in 1 liter of water, in which the weight ratio of NaCl to solid parts of water glass aqueous solution is 31%. 0.40 liter of triethanolamine is added as a surfactant. The pH value when aging is 4. After analysis, the mean particle size of primary particles of precipitation product is 30 nm, particle size of 95% particles is in the range of 18 to about 28 nm.

Example 5

Except for the following differences, the remaining conditions are the same as Example 3.

The total gas flow rate is 2.0 m$^3$/h, in which the component of $CO_2$ is 0.8 m$^3$/h (40% of the total volume). The volume flow rate of air is 1.2 m$^3$/h. The rotating speed of the RPBs is 1200 rpm. The carbonization reaction time lasts 20 min. The mean particle size of primary particles of precipitated product is 30 nm. The particle size of 90% particles is in the range of 20 to about 26 nm. The BET specific surface area is 152 m$^2$/g.

The qualifications of silica product mode by the invention reach such levels as follow:

| | |
|---|---|
| Silica (dry) | >98% |
| Crystal structure | amorphous |
| BET specific surface area | 100 to about 210 m$^2$/g |
| Decrement of heating (2h/105□) | 6.0 to about 7.0% (weight) |
| Decrement of igniting(2h/1000□) | 5.0 to about 6.0% (weight) |
| PH value | 6.3 to about 7.5 |
| DBP absorption value | 2.5 to about 3.0 ml/g |
| Apparent specific density | 0.085 to about 0.110 g/ml |
| Content of Na | <0.5% (weight) |
| Content of Al | <0.1% (weight) |
| Other impurities | <1% (weight) |

According to the illustration and the examples mentioned above of the invention, common technicians in this field can clearly recognize that the method of the invention can significantly decrease reaction time, enlarge the yield of the reaction, improve the qualities of final product, reduce the cost of reaction, in addition, the mean particle size of nano-silica product is 10 to about 50 nm, especially in the range of 15 to about 30 nm. The distribution of particle size is even and narrow. It also has an advantage of high dispersivity.

What is claimed is:

1. A method of making silica which uses water glass and $CO_2$-containing gas as raw materials, comprising the following steps of: diluting the water glass, reacting the diluted water glass with a $CO_2$-containing gas through a carbonization reaction, and post-treating the resultant to obtain silica, preferably a superfine silica, characterized in that the carbonization reaction is carried out under a high gravity field.

2. The method of claim 1 wherein the carbonization reaction is carried out in a Higee reactor.

3. The method of claim 2 wherein the aqueous solution of the water glass as a liquid reactant enters the inner chamber of a rotating packed bed of the Higee reactor from the liquid inlet pipe, and is sprayed to the inner edge of the packed bed through a distributor, and wherein the $CO_2$-containing gas as a reactant is introduced to the Higee reactor tangentially through a gas inlet pipe, and enters the packing from an outer edge of the packed bed where the $CO_2$-containing gas reacts in the carbonization reaction with the liquid reactant.

4. The method of claim 2 wherein, in the Higee reactor, the liquid reactant returns to the rotating packed bed, from the liquid outlet to the liquid inlet, and reacts continuously.

5. The method of claim 3 wherein, in the Higee reactor, the liquid reactant returns to the rotating packed bed, from the liquid outlet to the liquid inlet, and reacts continuously.

6. The method of claim 1 wherein the post-treatments comprise one or more of acidifying, aging, washing, filtering, drying, and grinding.

7. The method of claim 1 wherein the high gravity field comprises a centrifugal acceleration of about 20 to about 40,000 m/s$^2$.

8. The method of claim 2 wherein the rotating speed of the rotating packed bed is about 200 to about 2000 rpm.

9. The method of claim 8 wherein the rotating speed of the rotating packed bed is about 400 to about 1500 rpm.

10. The method of claim 8 wherein the rotating speed of the rotating packed bed is about 1000 to about 1200 rpm.

11. The method of claim 1 wherein the specific density of the aqueous solution of water glass is about 6 to about 13°Be', and wherein the $CO_2$-containing gas has a $CO_2$ concentration of more than 20% by volume.

12. The method of claim 11 wherein the specific density of the aqueous solution of water glass is about 7.5 to about 12°Be.

13. The method of claim 8 wherein the specific density of the aqueous solution of water glass is about 6 to about 13°Be', and wherein the $CO_2$-containing gas has a $CO_2$ concentration of more than 20% by volume.

14. The method of claim 13 wherein the specific density of the aqueous solution of water glass is about 7.5 to about 12°Be.

15. The method of claim 1 wherein a flocculating agent or surfactant can be incorporated as additives into the raw materials.

16. The method of claim 8 wherein a flocculating agent or surfactant can be incorporated as additives into the raw materials.

17. The method of claim 1 wherein the surfactant is selected from the group consisting of glycerin, triethanolamine, and ethanol.

18. A silica obtained according to the method of claim 1 wherein the silica is a superfine silica having a mean particle size of about 1 to about 100 nm.

19. The silica of claim 18 wherein the mean particle size is about 10 to about 50 nm.

20. The silica of claim 19 wherein the mean particle size is about 15 to about 30 nm.

* * * * *